Nov. 8, 1966  E. ARNOLD  3,284,101
TELESCOPING BUMPER-CLAMPING TOW BAR FOR VEHICLES
Filed Dec. 9, 1964  2 Sheets-Sheet 1
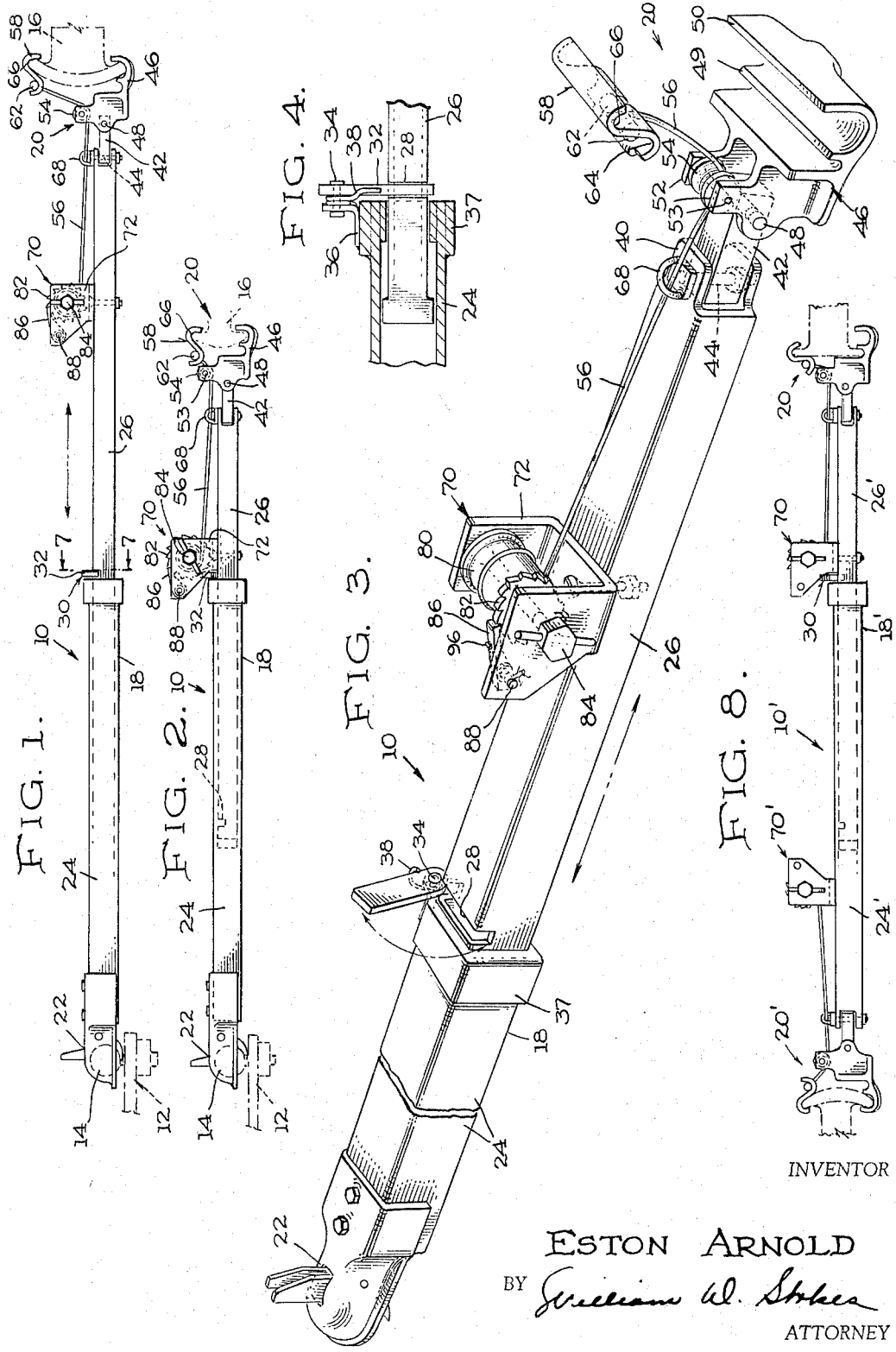
INVENTOR
ESTON ARNOLD
BY William W. Stokes
ATTORNEY Nov. 8, 1966 E. ARNOLD 3,284,101
TELESCOPING BUMPER-CLAMPING TOW BAR FOR VEHICLES
Filed Dec. 9, 1964 2 Sheets-Sheet 2
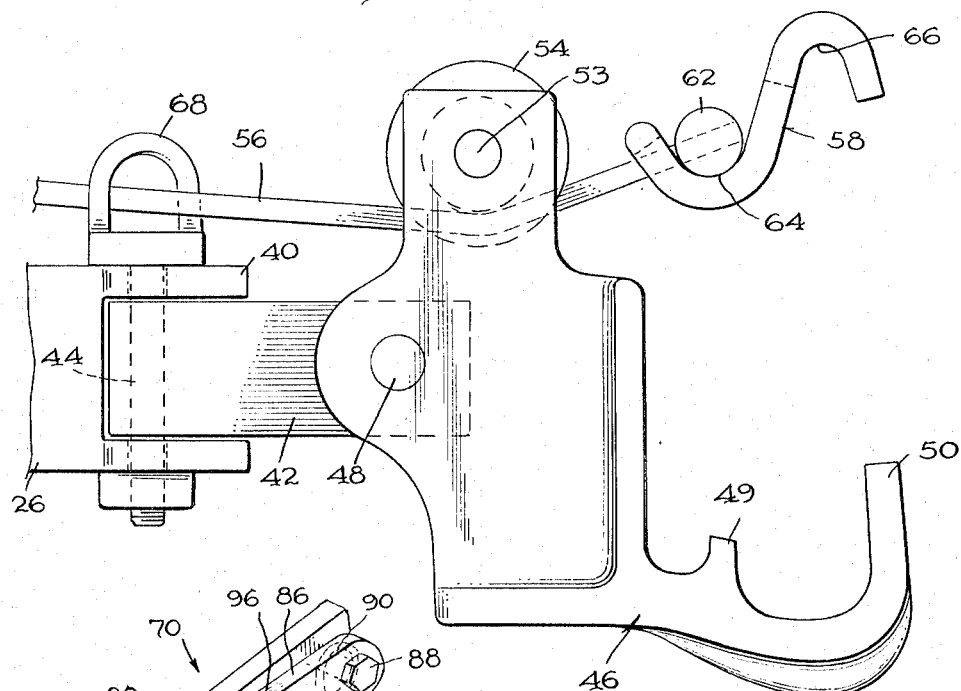
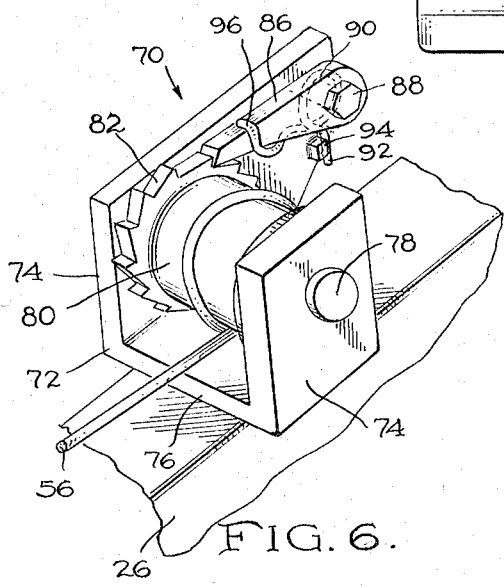
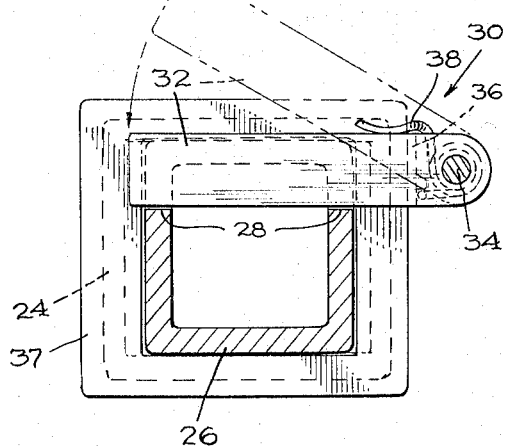
INVENTOR
ESTON ARNOLD
BY *William W. Stokes*
ATTORNEY

United States Patent Office 3,284,101
Patented Nov. 8, 1966

3,284,101
TELESCOPING BUMPER-CLAMPING
TOW BAR FOR VEHICLES
Eston Arnold, Buffalo, S.C., assignor of forty percent to
Milton C. Carr, Union, S.C.
Filed Dec. 9, 1964, Ser. No. 417,160
12 Claims. (Cl. 280—482)

This invention relates to an improved vehicle towing device and more particularly to a new and improved towing device which may be easily and readily attached to and detached from vehicle bumpers when interconnecting the vehicles for towing.

With the tremendous growth of the automobile industry in recent years the need for a simple and effective device whereby one vehicle can tow another has become of increasing importance. This increasing need has occurred not only because of the possibility of automobile breakdown within urban areas and on our highways and turnpikes, but also because of the practice now prevalent among automobile dealers of transporting used cars from one section of the country to another. In either instance, a simple, sturdy and easily operable towing device is required to perform the task in a satisfactory manner.

The art is cognizant of various types of towing devices for interconnecting two vehicles, all of which are apparently operable to some extent. However, these prior art devices have not proven entirely satisfactory for several reasons. The initial objection to these prior towing devices is that considerable difficulty has been encountered in placing the devices in proper position on the vehicle bumpers. Another objection has been the difficult and time consuming methods of adjusting the devices and locking them in position, especially with the many different types of vehicle bumpers in use today. In fact, some of these prior art towing devices are not operable, or difficultly so, on certain types of vehicle bumpers because of complicated adjustment requirements and construction. Still another objection to the prior art towing devices lies in the detachment thereof from the vehicle bumper after completion of the towing operation. Hence the art is well aware of the need for a simple, practical and efficient towing device which is universally operable as well as being quickly and easily connected to, and detached from, a vehicle bumper. The towing device of the present invention satisfies this need.

The provision of a towing device which satisfies the aforementioned requirements and which overcomes the disadvantages heretofore incurred by the prior art devices is accomplished by the present invention. In accordance with the present invention, there is provided a towing device for vehicles which is of simple construction and is universally adaptable for all types of vehicle bumpers.

A primary object of this invention is the provision of a simplified towing device for vehicles which can be easily and quickly installed and then removed in the shortest possible time. A further object of the present invention is to provide a novel towing device having novel clamping means which are readily adjustable to fit the bumpers of all presently manufactured vehicles.

Still another object of the present invention is to provide a novel towing device for vehicles wherein the novel clamping means at one or both ends of the towing device includes adjustable upper and lower clamping members, the upper and lower clamping members being connected to a tension member so that when tension is applied both clamping members will tightly grip the vehicle bumper. A more specific object is to provide an elongated telescoping tow pole containing the novel clamping means on one or both ends and novel latching means for holding the pole in extended position.

The heretofore defined objects of this invention are achieved by the provision of a towing device or tow bar comprising an elongated tow pole of telescoping construction having bumper clamping means at one or both ends, said bumper clamping means including a lower clamp member connected to the tow pole and an upper clamp member connected by tensioning means to the tow pole, the tensioning means extending through the lower clamp member whereby movement of the tensioning means urges the upper and lower clamp members to bumper clamping position. Locking means are also provided for locking the telescoping tow pole in extended position when attached to the vehicle bumpers.

Reference is now made to the drawings accompanying the application.

FIGURE 1 is a side elevational view of the tow bar in fully extended position;

FIGURE 2 is a side elevational view of the tow bar in retracted position;

FIGURE 3 is an enlarged perspective view of the tow bar illustrating the details thereof;

FIGURE 4 is a top plan view in section illustrating additional details of the telescope locking means;

FIGURE 5 is an enlarged side elevational view of the bumper clamp assembly attached to the tow pole;

FIGURE 6 is an enlarged perspective view of the cable tensioning assembly attached to the tow pole;

FIGURE 7 is a transverse sectional view taken on the line 7—7 of FIGURE 1 looking in the direction of the arrows and illustrates in detail the locking means for holding the telescoping sections in extended position; and FIGURE 8 is a side elevational view of another embodiment of the tow bar wherein a bumper clamp assembly is located on both ends of the tow pole.

Reference is now made to the drawings wherein like reference characters designate like or corresponding parts throughout the several views. In the drawings there is shown a tow bar comprising a centrally located tow pole, generally referred to by numeral 18, a bumper clamping assembly, generally referred to by numeral 20, and a conventional trailer hitch 22. This trailer hitch 22 located on one end of the tow pole may be of any conventional make or manufacture, the type illustrated being selected merely for exemplary purposes.

Referring now in greater detail to the drawings, and especially FIGURE 3, it will be noted that an embodiment of my invention in specific structural detail is set out.

The tow bar, referred to generally by numeral 10, comprises a tow pole 18, which includes two telescoping sections 24 and 26 with inner section 26 being slidable into and out of outer section 24 as indicated by the arrows in FIGURES 1 and 3. The inner section 26 has a transverse slot 28 which is exposed when the telescoping sections are fully extended. The outer section 24 is provided with locking means, generally referred to by numeral 30, which cooperates with slot 28 to lock the telescoping sections in fully extended position. In FIGURE 4 there is presented a top plan view illustrating the latch means and the position of the inner pole member 26 and outer pole member 24 when extended.

The latch means 30, as illustrated in FIGURES 3, 4 and 7, comprises a detent 32 pivoted by means of a pin 34 on a bracket 36. Bracket 36 is mounted on the end of outer section 24. In the illustrated embodiment, bracket 36 is shown to be mounted on a collar 37 fixed on outer section 24. The detent 32 is biased toward the locking position by a torsion spring 38 and is held in position thereby. It will be appreciated that other biasing means could be used to place and maintain detent 32 in the locking position.

As shown in the embodiment depicted in FIGURES 1, 2 and 3, the bumper clamp assembly 20 is mounted on the bifurcated outer end 40 of the tow pole inner section 26. An enlarged elevational view of the clamping device is shown in FIGURE 5. The bumper clamp assembly 20 comprises a support member 42 pivotally mounted on a vertical axis by means of bolt pin 44 extending through the bifurcated end 40 of bar member 26. A lower clamp member 26 in the form of a hook is pivotally mounted on a horizontal axis to the support member 42 by means of a pin 48 extending through support member 42. The lower clamp member 46 comprises two vertically arranged flanges 49 and 50 which are adapted to receive the lower portion of a bumper 16 between them as shown for example in FIGURE 1. Forming an integral part of lower clamp member 46 is a pair of vertically extending ears 52. Mounted between ears 52 on pin 53 is a rotatable guide member 54 for guiding tensioning cable 56. An upper clamp member 58 in the form of an S-shaped hook is attached to the end of the cable 56. As illustrated in FIGURE 5, it is preferred that cable 56 be fixed to a stop member 62 which is seated in one curved portion 64 of the S-shaped hook 58. The other curved portion 66 is designed in such a manner as to grasp the upper portion of a bumper 16 as illustrated in FIGURE 1.

A guide member 68 for receiving cable 56 is mounted on the outer end 40 of inner section 26 of tow pole 10. As may be appreciated, guide member 40 may form the head of bolt pin 44. Mounted on bar member 26, inwardly of the guide member 68, is the cable tensioning assembly, generally referred to by numeral 70. See FIGURE 6 where an enlarged perspective view of the cable tension assembly is shown. The cable tensioning assembly 70 comprises a U-shaped support bracket 72 having side plates 74 and a bottom plate 76. A drum and ratchet device, 80 and 82 respectively, is rotatably mounted between side plates 74 by means of axle 78 extending through the side plates. Cable 56 is affixed to one end of the drum 80. Ratchet wheel 82 is mounted on the end of drum 80 and rotates with the drum upon turning of the axle 78 by means of a key or handle 84. As the drum rotates in a clockwise direction, as viewed in FIGURE 3, the cable 56 is wound on the drum. To prevent the cable unwinding inadvertently, a pawl 86 is pivotally mounted on pin 88 which is fixed to side plate 74, as illustrated in FIGURE 6. The pawl 86 is spring biased to ratchet locking position by means of a torsion spring 90 which is turned around the pin 88 and has one end 92 pressing against a top 94 on plate 74 and has its other end 96 pressing on the top of the pawl. When it is desired to loosen the tension on the cable 56, the pawl 86 is merely lifted off the ratchet wheel 82 which allows the drum 80 to rotate in a counterclockwise manner and permits the cable to unwind.

On the opposite end of the tow pole there is mounted a conventional trailer hitch 22 as depicted in FIGURES 1–3. The conventional trailer hitch 22 is placed on ball 14 which is attached to the towing vehicle assembly 12. Other types of trailer hitches are clearly operable and that shown in the drawings is not intended to limit the scope of the present invention in any manner.

In FIGURE 8, there is depicted a modification of the tow bar illustrated in FIGURES 1 to 3 and represents another embodiment of my invention. The tow bar 10' in FIGURE 8 is designed to be utilized when the towing vehicle is not equipped to receive a trailer hitch as in the embodiment described hereinbefore. In the embodiment set out as FIGURE 8, tow bar 10' includes a centrally located tow pole 18', which is composed of telescoping sections 24' and 26'. Section 26' is identical in all respects to section 26 of tow bar 10, described above, and includes bumper clamp assembly 20 and cable tensioning assembly 70. Section 24' differs from section 24 of tow bar 10 in that it utilizes a bumper clamp assembly 20' on its end rather than a trailer hitch 22. Mounted on section 24' is a cable tensioning assembly 70' which manipulates the bumper clamp assembly 20'. This cable tensioning assembly 70', in the embodiment depicted in FIGURE 8, is identical to cable tensioning means 70' described above except that it is of reverse structure. It is mounted on section 24' to regulate clamping means 20' as tensioning means 70 regulates clamping means 20 on the opposite end of the tow pole. Locking means 30 in this embodiment locks the telescoping sections in the same manner as described above with respect to the embodiments disclosed in FIGURES 1, 2 and 3.

The operation of this novel towing device is exceedingly simple and the installation thereof can be performed in a relatively short time. When utilizing the embodiment described in FIGURE 2, the trailer hitch 22 is first placed on the ball 14 of the towing vehicle. The inner section 26 of the tow pole is then pulled out from section 24 whereby detent 32 is automatically biased into slot 28 to lock the two sections 24 and 26 in fully extended position as shown in FIGURE 1. Lower clamp member 46 is then placed under the bumper of the vehicle to be towed and upper clamp member 58 is placed over the top of the bumper, also as illustrated in FIGURE 1. The cable 56 is then tensioned by rotating handle 84 in a clockwise direction (FIGURE 3) which draws in the cable 56 on drum 80. As can be seen in FIGURE 1, tensioning of the cable 56 will tighten both clamping members 46 and 58. When the cable 56 is drawn tight enough so that clamping members 46 and 58 hold the bumper in a secured position, pawl 86 automatically engages ratchet 82 and thereby maintains the ratchet in a locked position as can be seen in FIGURE 6. Thus these simple adjustments place the tow bar in proper position for use. When in use, pivoted connections 44 and 48 permit sufficient "play" or maneuverability between the towed vehicle and the towing vehicle.

When it is desired to remove the tow bar after completion of the towing operation it is merely necessary to raise pawl 86 off ratchet 82 thereby permitting the cable 56 to unwind off drum 80. This eases the tension on the clamping members 46 and 58 for removal from the vehicle bumper.

When it is desired to apply a tow bar of the type described in a situation where the towing vehicle is not equipped with a trailer hitch, then the embodiment shown in FIGURE 8 is utilized. In this device, bumper clamping means 20 and 20' are positioned on both ends of the tow pole 10'. Thus the operation described above is merely carried out on both ends of the tow bar in attaching to the two bumpers in that both ends must be tightened by the cable tensioning means 70 and 70'. Subsequently, both ends must be loosened when detaching the tow bar.

The towing device, or tow bar, as described hereinbefore, is the essence of simplicity and maneuverability over other types of towing devices heretofore known to the prior art. It requires only seconds to place the clamping means onto the vehicle bumper and tighten the tensioning cable. When the cable is secure the apparatus is ready to perform the towing operation. When the towing is completed, the mere raising of the pawl holding the ratchet in position loosens the tension on the cable and the tow bar is merely lifted off the bumper. Hence the tow bar of the instant invention combines all the advantages of prior art devices and yet is easier to handle, simpler to operate and quicker to attach and detach. Moreover the telescoping tow pole permits retraction of the tow bar when not in use thus providing easier and more economical storage.

It is to be understood that the form and design of my invention, as shown and described herein, are to be taken merely as exemplary of the same and that various changes and modifications in the shape, size and arrangement of components may be made without departing from the spirit and scope thereof as defined in the appended claims.

I claim:

1. A towing assembly comprising a tow pole having bumper clamp means at one end, said bumper clamp means including a lower clamp member connected to said tow pole, an upper clamp member and tensioning means, said tensioning means comprising a cable attached to one end of said upper clamp member, said cable extending through said lower clamp member and being attached at its other end to adjustable means on said tow pole to control the effective length of said tensioning means, whereby movement of said adjustable means urge the bumper clamping means to tightly grip said bumper.

2. The tow bar assembly of claim 1 wherein the adjustable means comprises a rotatable drum to which said other end of the cable is fixed, a ratchet wheel fixed to the drum, and a pawl for the ratchet wheel to retain the drum in a predetermined position.

3. The towing assembly of claim 1 wherein the lower clamp member is of hook shape and is pivoted to said tow pole.

4. The towing assembly of claim 1 wherein the opposite end of said tow pole includes a trailer hitch.

5. The towing assembly of claim 1 wherein the opposite end of said tow pole includes bumper clamp means.

6. A tow bar assembly comprising a tow pole formed of elongated telescoping sections, locking means to lock said telescoping sections in an adjusted position, said tow pole having bumper clamp means at one end and bumper connection means at the other end, said bumper clamp means including a lower clamp member pivoted to said tow pole, an upper clamp member and tensioning means, said tensioning means comprising a cable attached to one end of said upper clamp member, said cable extending through said lower clamp member and being attached at its other end to adjustable means on said tow pole to control the effective length of said tensioning means, whereby movement of said adjustable means urge the bumper clamping means to tightly grip said bumper.

7. The tow bar assembly of claim 6 wherein the adjustable means comprises a rotatable drum to which said other end of the cable is fixed, a ratchet wheel fixed to the drum, and a pawl for the ratchet wheel to retain the drum in a predetermined position.

8. The tow bar assembly of claim 6 wherein said bumper connection means comprises a trailer hitch.

9. The tow bar assembly of claim 6 wherein said bumper connection means comprises bumper clamp means.

10. The tow bar assembly of claim 6 wherein the latch means comprises a slot in one of said telescoping sections and a detent on the other of said telescoping sections whereby when said telescoping sections are in adjusted position, the detent will enter the slot to lock the sections in position.

11. In a motor vehicle having a bumper, a tow bar assembly comprising a tow pole formed of elongated telescoping sections, said tow pole having bumper clamp means at one end to engage said bumper, said bumper clamp means including a lower clamp member pivoted to said tow pole, an upper clamp member and tensioning means, said tensioning means comprising a cable attached to one end of said upper clamp member, said cable extending through said lower clamp member and being attached at its other end to adjustable means on said tow pole to control the effective length of said tensioning means, whereby movement of said adjustable means urge the bumper clamping means to tightly grip said bumper.

12. The tow bar assembly of claim 11 wherein the adjustable means comprises a rotatable drum to which said other end of the cable is fixed, a ratchet wheel fixed to the drum, and a pawl for the ratchet wheel to retain the drum in a predetermined position.

References Cited by the Examiner
UNITED STATES PATENTS

| | | | |
|---|---|---|---|
| 2,326,466 | 8/1943 | Kitterman | 280—33 |
| 2,672,353 | 3/1954 | Gross | 280—505 |
| 3,011,800 | 12/1961 | Mitsuyasu | 280—482 |

LEO FRIAGLIA, *Primary Examiner.*